July 13, 1965 R. W. GRANT 3,194,258
FLOAT OPERATED VALVE
Filed April 29, 1963 2 Sheets-Sheet 1
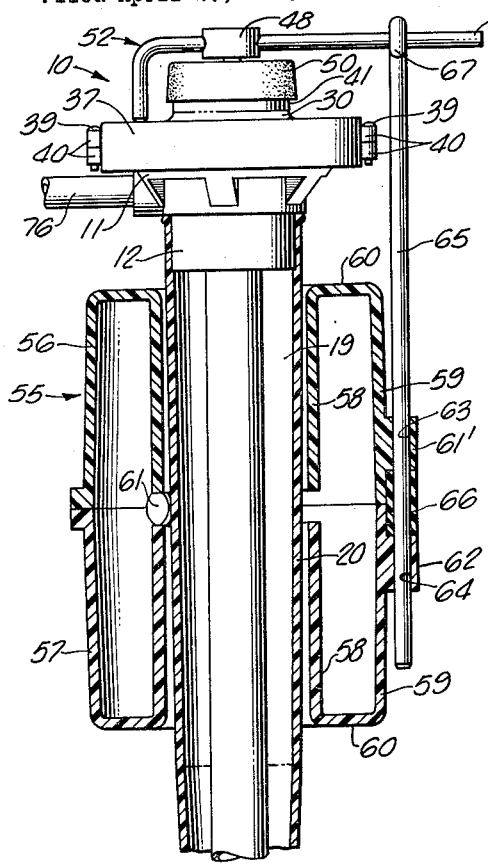
FIG. 1.
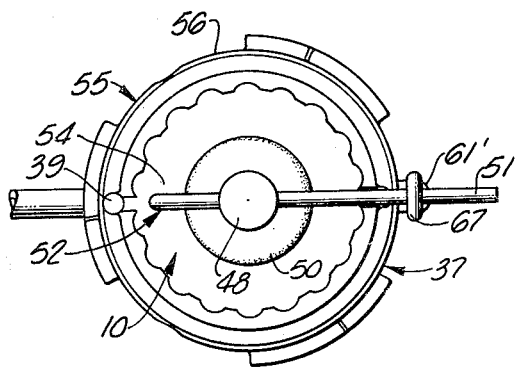
FIG. 2.
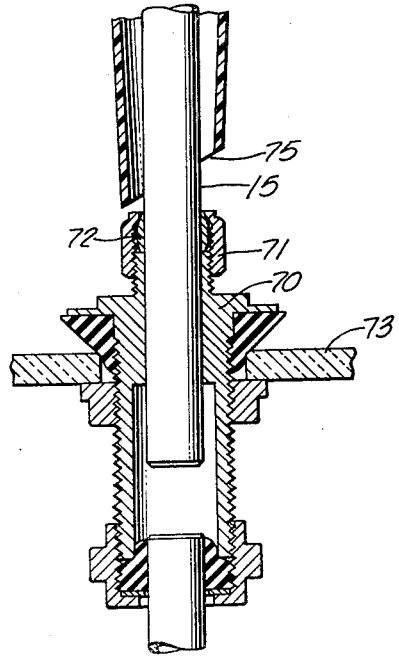
INVENTOR.
RICHARD W. GRANT
BY
ATTORNEYS July 13, 1965  R. W. GRANT  3,194,258

FLOAT OPERATED VALVE

Filed April 29, 1963  2 Sheets-Sheet 2

INVENTOR.
RICHARD W. GRANT

BY
ATTORNEYS

United States Patent Office 3,194,258
Patented July 13, 1965

3,194,258
FLOAT OPERATED VALVE
Richard W. Grant, Inglewood, Calif., assignor to Zila Manufacturing Corporation, Gardena, Calif., a corporation of California
Filed Apr. 29, 1963, Ser. No. 276,557
1 Claim. (Cl. 137—414)

This is a continuation-in-part of my copending application, Serial No. 58,346, filed Sept. 26, 1960, for Float Operated Valve, now abandoned, which application was a continuation-in-part of my earlier application Serial No. 829,737, filed July 27, 1959, now abandoned.

This invention relates to valves and is particularly directed to improvements in float operated valves of the type commonly employed in water-closet tanks.

It is the principal object of this invention to provide a novel form of unitary valve assembly having a main valve closed by liquid pressure, together with a float operated pilot valve for controlling the action of the main valve.

Another object is to provide a float operated valve of this type having superior operating characteristics including silent filling action and rapid and positive shutoff.

Another object is to provide a novel float operated valve of this type having a compact head unit of minimum height and incorporating the main valve and seat, the pilot valve, and suction breaker to prevent back flow.

Other and more detailed objects and advantages will appear hereinafter.

In the drawings:

FIGURE 1 is an elevation partly in section showing a preferred embodiment of my invention.

FIGURE 2 is a top plan view thereof.

Figure 3:
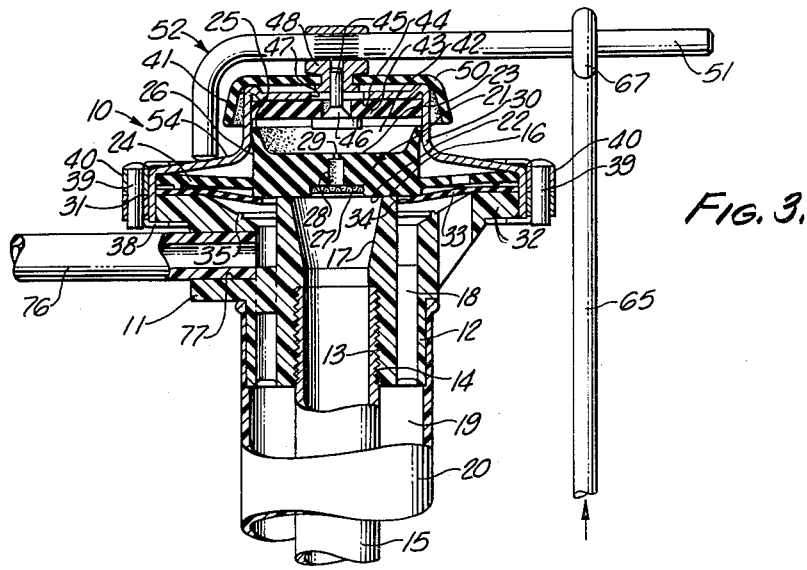
FIGURE 3 is a sectional elevation showing the valve parts in closed position.

Referring to the drawings:

The valve assembly generally designated 10, includes a valve body 11, which is preferably formed of plastic material. The valve body 11 is generally circular in outline and has a central axial tubular portion 12 provided with internal threads 13. These threads 13 engage the external threads 14, provided on the upper end of the upstanding water supply tube 15. The valve body 11 is thus supported on the water supply tube 15.

A stationary annular seat 16 is provided on the valve body 11 at one end of the central passage 17 which communicates with the interior of the water supply tube 15. Axially extending discharge openings 18 are provided in the valve body 11, radially outwardly of the annular seat 16. These discharge openings 18 communicate with the annular space 19 defined between the water supply tube 15 and the concentric hush tube 20. The lower end of the valve body 11 is pressfitted into the upper end of this hush tube 20, and the hush tube 20 is thus supported on the valve body 11.

The piston member 21 is circular in outline and is formed of flexible material, and the lower annular face 22 of this member is adapted to engage the stationary annular seat 16 on the valve body 11. The piston member 21 has a relatively thick central portion 23 having an outer cylindrical surface 26 and an encircling integral flange 24 which is relatively thin. An upstanding annular lip 25 projects upward from the surface 26. A metal cap 30 encloses the member 21 and is provided with a downward extending skirt 31 which encircles flange 24 of the member 21 and the end ring 32 formed integrally on the valve body 11. A split hinged retainer 37 encircles the skirt 31 and has upper and lower horizontal flanges 38 overlying the outer portion of the cap 30 adjacent the skirt 31 and underlying the end ring 32. Pivot pins 39 connect aligned apertured lugs 40 on the ends of the duplicate half sections of the retainer 37.

The outer portion of an annular antisyphon diaphragm 33 is positioned between the flange 24 and the end ring 32. The diaphragm 33 is formed of flexible material and has a central opening 34 which is larger in diameter than the seat 16. The inner portion of the anti-syphon diaphragm 33 is adapted to seat on the annular rim 35 provided on the valve body 11 to close off the suction openings 36 which are provided in the valve body 11 and communicate with the atmosphere. A screen 27 is mounted within the piston member 21 at the lower end of the central bore 28. A small central opening 29 cooperates with the opening 28 to provide an aperture extending centrally through the piston member 21.

The cap 30 has a cylindrical portion 41 which is engaged in sliding relationship by the lip 25 and cylindrical surface 26 on the piston member 21. The metal cap 30 cooperates with the piston member lip 25 to define a valve chamber 42 within the cap 30. Positioned within this valve chamber 42 is a pilot valve disc 43 which is formed of flexible material and which is engageable with the end wall 44 of the cap 30 to form a seal. This pilot valve disc 43 is loosely received on the central stem 45 of the pilot valve head 46. The stem 45 projects through a central opening 47 in the valve cap 30 and is press fitted into a bore in the button 48. A groove 49 on the button 48 receives the central aperture of a flexible antisplash arrester 50. The button 48 is located outside of the valve chamber 42. The lever 52 has a short vertical leg which engages the annular flange surface 54 on the valve cap 30.

A float generally designated 55 slides freely on the outer surface of the hush tube 20. This float 55 comprises duplicate half sections 56 and 57 which are preferably formed of molded plastic material and connected end to end. Each of these half sections includes concentric inner and outer tubular parts 58 and 59 joined by an end wall 60. The construction of the float 55 is preferably similar to that shown in my copending application, now Serial No. 276,558, filed April 29, 1963. The two halves of the float 55 cooperate to form one or more openings 61. Water automatically enters these openings to weight the float 55 to provide adequate force to actuate the valve 10 when the tank is emptied.

Each of the float halves 56 and 57 is provided with a boss 61', 62 having axially extending apertures 63, 64. A float rod 65 is inserted axially through the aligned apertures 63 and 64 and also through the resilient locking washer 66 which is positioned between the bosses 61' and 62. The central opening in the washer 66 is slightly smaller than the diameter of the rod 65 with the result that a friction grip is maintained on the rod 65 to hold it in adjusted position with respect to the float 55. The upper end of the rod 65 is provided with an eye 67 which loosely receives the horizontally extending arm 51 of the lever 51.

The supply pipe 15 is slidably received within the tank fitting 70 and is clamped at adjusted height by the nut 71 and bushing 72. A portion of the tank is shown at 73.

In operation, the parts are in the position shown in FIGURE 1 when the tank is filled to the desired level. In this position of the parts, water pressure within the supply pipe 15 passes through the aperture in the center of the piston member 21, and this pressure exists within the valve chamber 42. No water escapes from the valve chamber because the pilot valve disc 43 is closed against the end wall 44 of the metal cap 30. Pressure within the chamber 42 acts over the entire exposed area of the upper surface of the piston member 21 within the lip 25 to cause the lower surface 16 to remain in sealing engagement with the stationary annular seat 16.

When the tank is drained by means of the conventional flush valve, not shown, the water level drops in the tank 73 and the float 55 descends by gravity, sliding over the outer surface of the stationary hush tube 20. This downward movement of the float 55 causes the attached rod 65 to pull down on the horizontal arm 51 of the lever 52 and thereby move the parts from the position shown in FIGURE 3 to the position shown in FIGURE 4. Water in the valve chamber 42 then escapes through the central opening 47 in the cap 30 and flows outward between the cap 30 and the rubber splash arrester 50. Water flows out of the valve chamber 42 faster than it can flow in through the small aperture 29 in the piston member 21, and the reduction in pressure within the valve chamber 42 causes the piston member 21 to raise off the seat 16. Movement of the piston member 21 is guided by the piston and cylinder action of the thick central portion 23 sliding within the cylindrical portion 41 of the cap 30. Water from the supply tube 15 flows upward through the central passage 17 and then over the annular seat 16 and into the passages 18. The inner portion of the anti-syphon diaphragm 33 closes against the rim 35 to prevent escape of water through the suction openings 18 into the annular space 19 within the hush tube 20 and is discharged into the tank through the inclined lower end 75 of the hush tube 20. Water from the supply pipe 15 passing over the stationary seat 16 also enters the overflow pipe 76 which communicates with the interior of the valve body 11 by way of the port 77.

Figure 4:
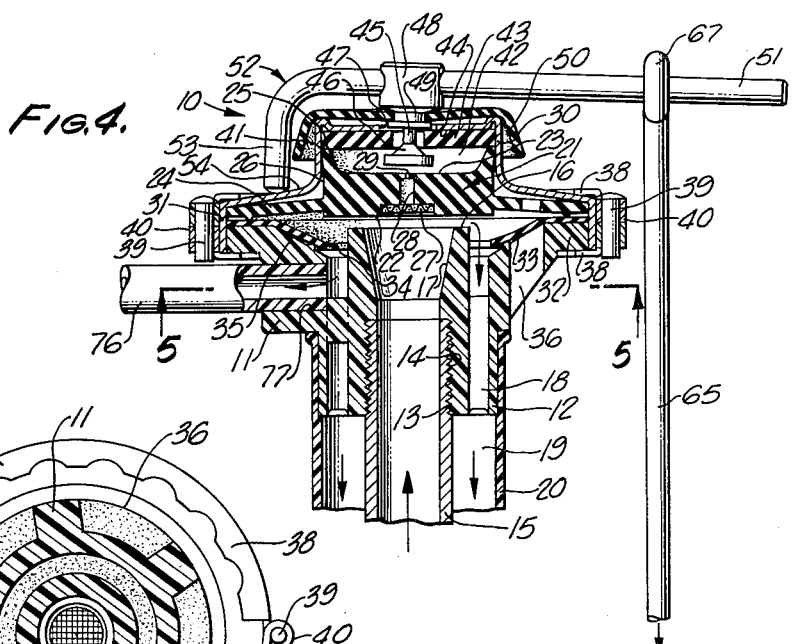
FIGURE 4 is a sectional view similar to FIGURE 3, but showing the valve parts in open position.
Figure 5:
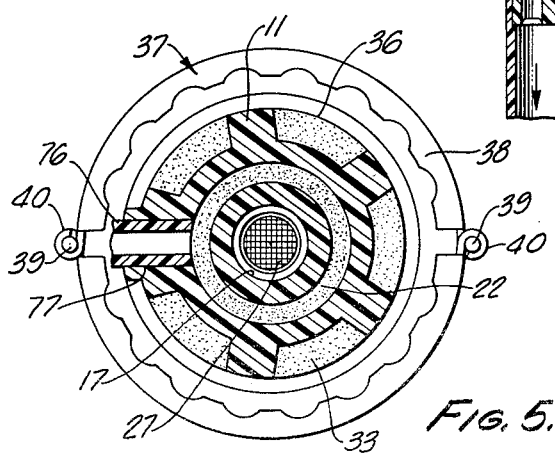
FIGURE 5 is a sectional view taken substantially on lines 5—5 as shown on FIGURE 4.

When the water level in the tank rises to the desired height following closing of the conventional flush valve, not shown, the float 55 slides upward along the hush tube 20 and returns the parts to the position shown in FIGURE 3. The enlarged head 46 on the lower end of the stem 45 then prevents leakage of water from the valve chamber 42 through the central opening in the pilot valve disc 43. Water passing into the valve chamber 42 through the aperture 29 causes a build-up of pressure within the valve chamber and returns the piston member 21 to the closed position against the seat 16.

Having fully described my invention it is to be understood that I am not limited to the details herein set forth, but that my invention is of the full scope of the appended claim.

I claim:

In a float-operated tank-filling valve assembly, the combination of: a valve body having a central passage adapted to receive liquid under pressure, and having an annular seat at one end of said passage, the valve body also having discharge openings and suction openings both positioned radially outwardly of said seat, a piston member having a relatively thick central portion adapted to engage said seat at one end and having a relatively thin annular flange adjacent said end, an annular antisiphon diphragm underlying said annular flange and movable downward to close said suction openings, means acting to clamp the peripheries of said annular flange and said antisiphon diaphragm to the valve body, said means including a metal cap having a cylindrical wall slidably receiving the piston member and co-operating therewith to define a valve chamber, the said piston member also having an aperture connecting said valve chamber to said central passage, means including a float-operated pilot valve operable to control escape of liquid from said valve chamber, said means including a pilot valve disc having a central opening and positioned within said valve chamber and contacting said cylindrical wall, said means also including a movable pilot valve element having a head portion within the valve chamber and acting to control flow out of said valve chamber through said central opening, a portion of the piston member in raised position encircling a portion of said pilot valve element, the pressure in the valve chamber when the pilot valve is closed acting to hold said piston member against said seat, and the pilot valve when open acting to permit escape of liquid from said valve chamber to cause movement of said central portion of the piston member away from said seat and thereby allow flow of liquid from said central passage into said discharge openings.

References Cited by the Examiner
UNITED STATES PATENTS

| | | | |
|---|---|---|---|
| 2,588,242 | 3/52 | Hunter | 137—414 |
| 2,731,979 | 1/56 | Crockett | 137—414 |
| 2,868,492 | 1/59 | Volcov et al. | 251—46 |
| 2,986,155 | 5/61 | Doyle | 137—218 |

WILLIAM F. O'DEA, *Primary Examiner.*